(12) United States Patent
Leutert

(10) Patent No.: US 7,413,249 B2
(45) Date of Patent: Aug. 19, 2008

(54) CHILD SEAT FOR A VEHICLE

(75) Inventor: Ruedi Leutert, Madiswil (CH)

(73) Assignee: Prospective Concepts AG, Glattbrugg (CH)

( * ) Notice: Subject to any disclaimer, the term of this patent is extended or adjusted under 35 U.S.C. 154(b) by 0 days.

(21) Appl. No.: 10/553,093

(22) PCT Filed: Apr. 13, 2004

(86) PCT No.: PCT/CH2004/000221

§ 371 (c)(1),
(2), (4) Date: Oct. 13, 2005

(87) PCT Pub. No.: WO2004/091964

PCT Pub. Date: Oct. 28, 2004

(65) Prior Publication Data

US 2006/0279125 A1 Dec. 14, 2006

(30) Foreign Application Priority Data

Apr. 15, 2003 (CH) ..................... 680/03

(51) Int. Cl.
*A47C 15/00* (2006.01)
*A47D 1/10* (2006.01)
(52) U.S. Cl. .............. 297/237; 297/238; 297/250.1; 297/452.41
(58) Field of Classification Search ............. 297/250.1, 297/237, 238, 452.41, 112, 113
See application file for complete search history.

(56) References Cited

U.S. PATENT DOCUMENTS

| 4,840,425 | A | * | 6/1989 | Noble ..................... 297/284.1 |
| 4,905,329 | A | * | 3/1990 | Heilner ......................... 5/654 |
| 5,161,855 | A | * | 11/1992 | Harmon ..................... 297/238 |
| 5,292,176 | A | * | 3/1994 | Artz ......................... 297/250.1 |
| 5,516,188 | A | * | 5/1996 | Bruhnke et al. ............. 297/129 |
| 5,588,699 | A | * | 12/1996 | Rundle et al. .......... 297/216.11 |
| 5,634,685 | A | * | 6/1997 | Herring ................. 297/219.11 |
| 5,678,891 | A | * | 10/1997 | O'Neill et al. ........... 297/284.6 |
| 6,601,616 | B1 | * | 8/2003 | Lenox ..................... 140/123.6 |

FOREIGN PATENT DOCUMENTS

| DE | 298 14 284 | 11/1998 |
| DE | 200 16 932 | 9/2001 |
| EP | 0 691 239 | 1/1996 |
| WO | WO-01/66380 | 9/2001 |
| WO | WO-2004/009399 | 1/2004 |

\* cited by examiner

*Primary Examiner*—Sarah B McPartlin
(74) *Attorney, Agent, or Firm*—Winstead PC

(57) ABSTRACT

The inventive pneumatic child seat (1) comprises a back part (8) and a seating part (7). The child seat (1) can be impinged upon by pressure from a pressure gas store (11) after the closing element (6) is opened. The child seat (1) automatically unfolds from an opening (5) in a back rest (4) of a vehicle seat, changes into the represented shape and is disposed on the seat (3) of a vehicle seat. Said child seat is configured in such a manner that the back part (8) can be supported separately, extending into the opening (5) when impinged upon by pressure from a pocket (17) and being secured therein.

13 Claims, 4 Drawing Sheets

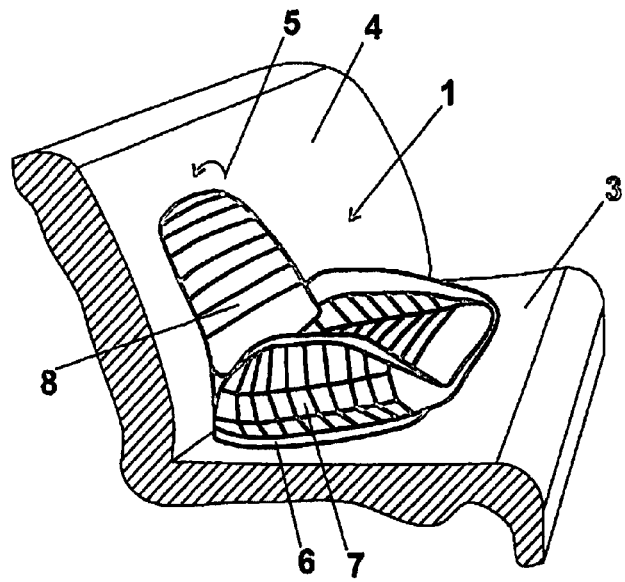
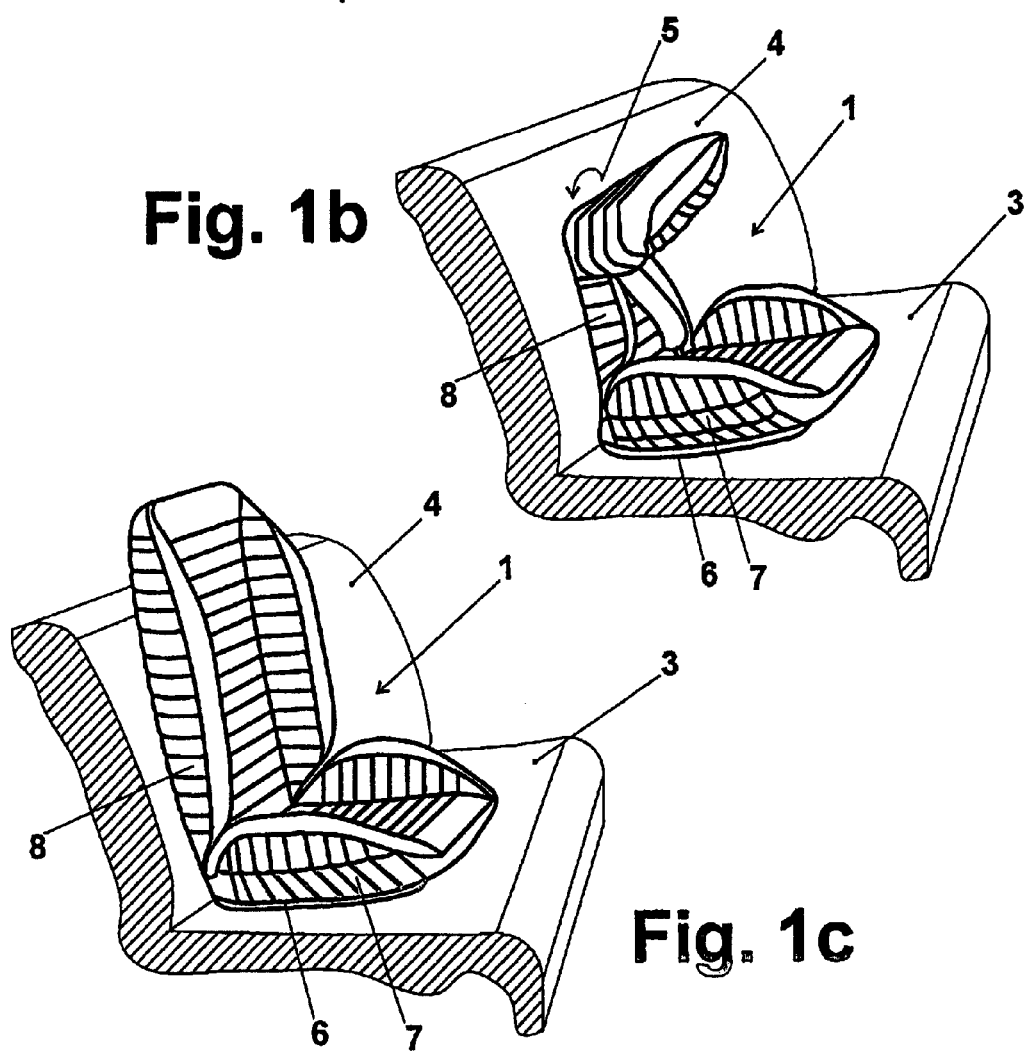

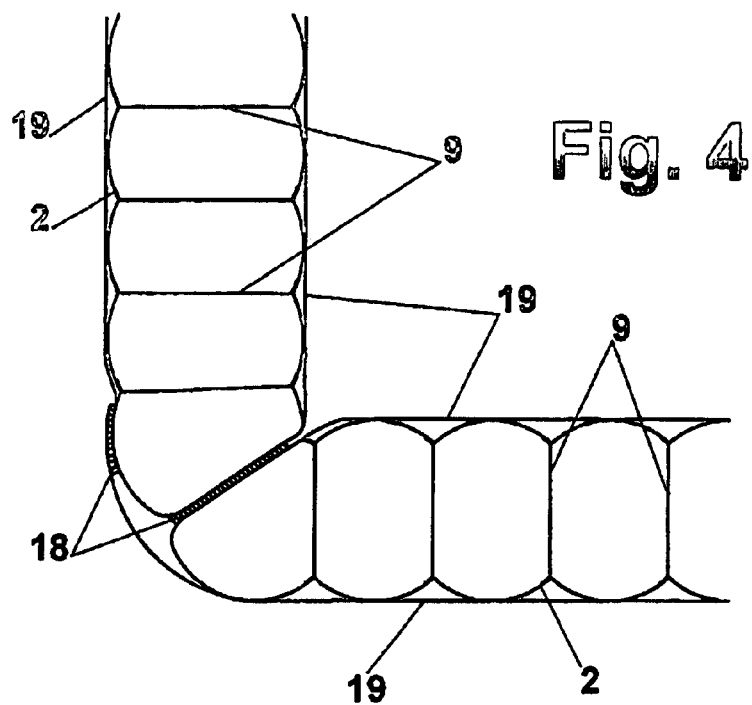
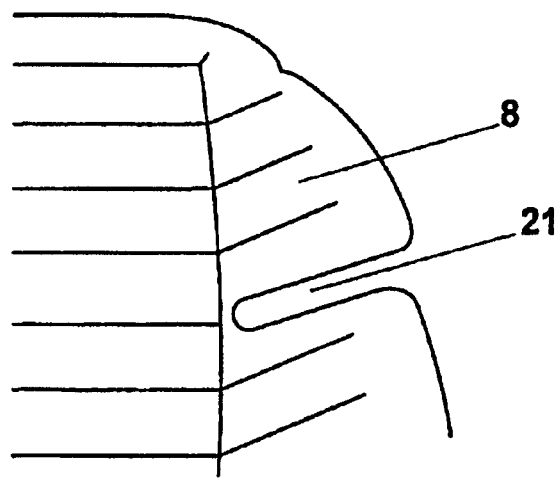

CHILD SEAT FOR A VEHICLE

The invention relates to a child seat for a vehicle according to the preamble of claim 1.

Child seats as such are known. Apart from the safety and comfort for children, easy handling is an important feature. A child seat should be easy to install and remove and have a weight as low as possible, since the adjustment and movement of heavy objects in general in a passenger car is extremely awkward and, in a stooping position, is also hazardous to health.

As to the type of design, application PCT/CH03/00017 comes closest to the present invention. The document of the same applicant discloses pneumatic seating and back cushions for vehicles and aircraft. The cushions are constituted by a gas-tight envelope. Ribs, which give the filled envelope the external shape, run inside the envelope. These seating and back cushions are conceived as a fully adequate and easy replacement for seats in means of transport.

Although these cushions have a pneumatic form, they are permanently installed and a fixed component of a vehicle or aircraft. Consequently, they are neither collapsible nor space-saving.

The problem of the present invention is to design a child seat which overcomes the aforementioned drawbacks of pneumatic seating cushions and back cushions.

The solution to the problem posed is set out in the characterising part of the independent claim in respect of its main features and in the dependent claims in respect of further advantageous features.

The present invention concerns a pneumatic child seat. Like conventional child seats, it can be installed in a vehicle seat or a bench seat at the side or in the middle. The child seat according to the invention can obviously also be fitted at another point in the vehicle interior. If it is not required, it does not have to be removed, but rather the compressed air is merely sucked out and the essentially empty envelope is stowed in an opening, in a vehicle seat for example, which is specially provided for the purpose and can be closed. If the child seat is again required, it is sufficient to release the closure of the opening and to pressurise the envelope again, as a result of which the child seat automatically unfolds and can then be used again in the usual way.

The child seat according to the invention is described in detail with the aid of the following figures.

Figure 2A:
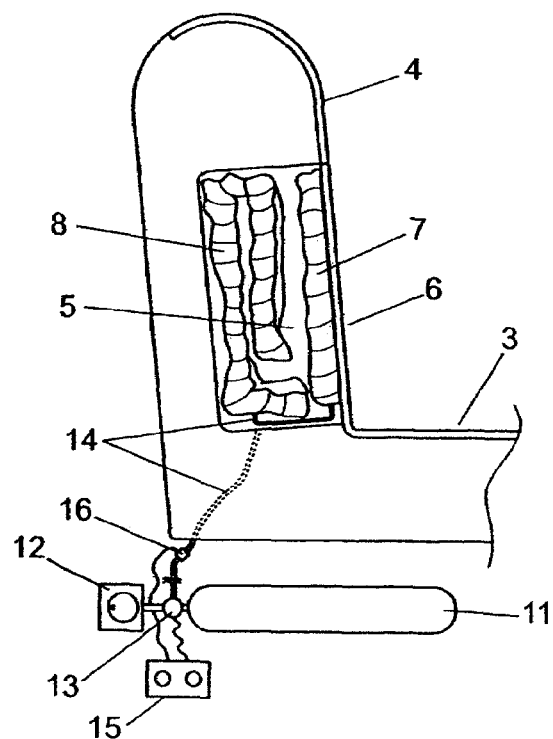
Figure 2B:
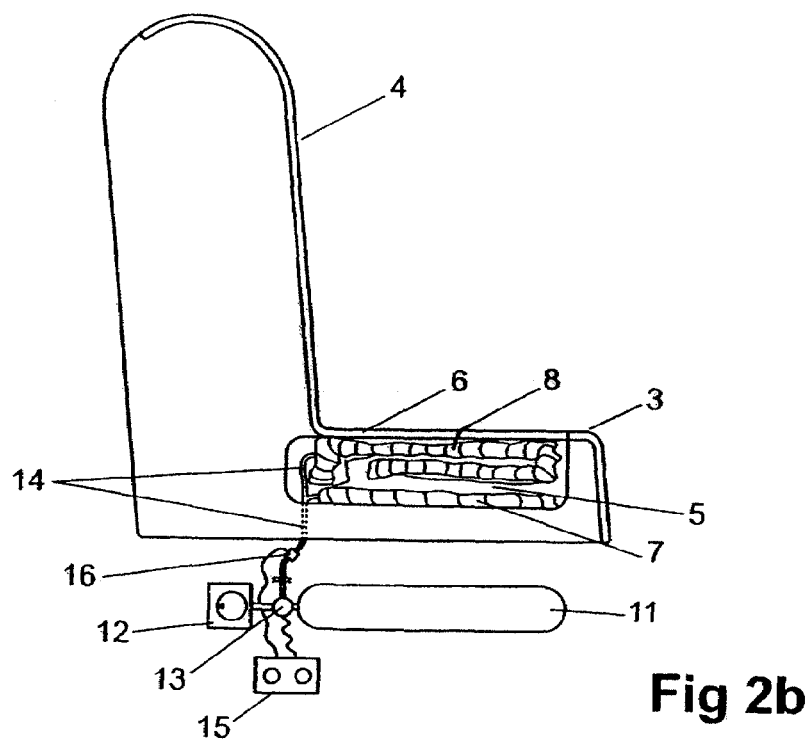
Figure 3A:
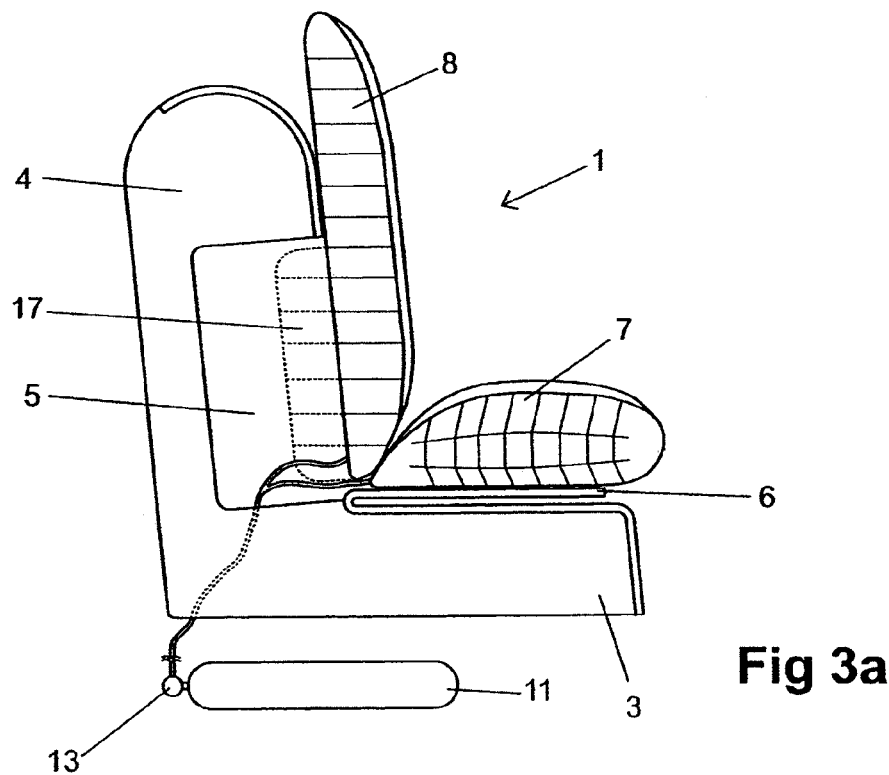
Figure 3B:
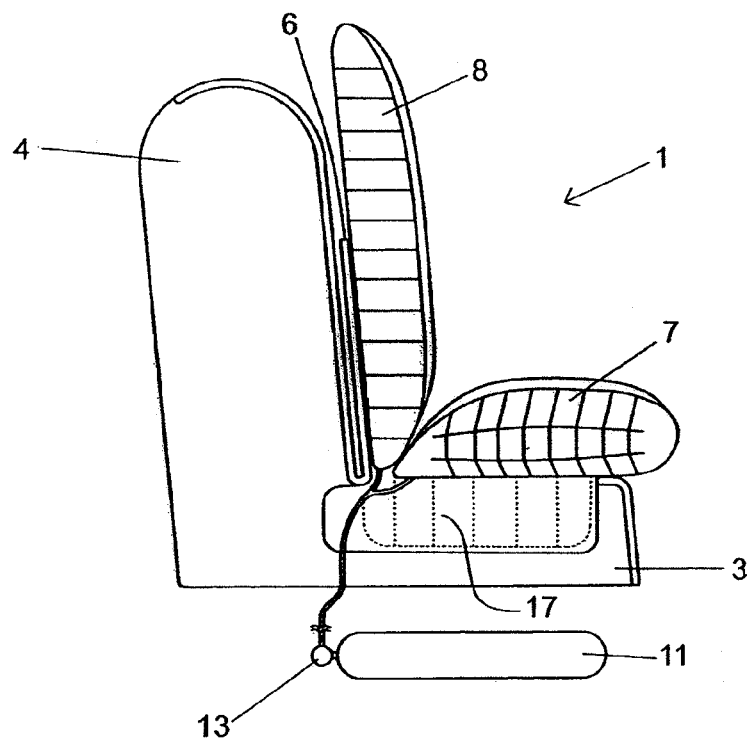

In the figures:

FIGS. 1a-c show the unfolding of a child seat in the presence of pressurisation, FIGS. 2a-2b show cross-sections through a vehicle seat with an installed child seat, FIGS. 3a-3b show embodiments of the child seat, FIG. 4 shows the internal structure of the child seat, FIG. 5 shows a detail view of a part of the back part.

FIGS. 1a-c show the unfolding of a child seat 1 according to the invention in the presence of pressurisation.

An opening 5 is provided in a backrest of a vehicle bench seat in FIG. 1a. Closure element 6 has already been folded down onto seating area 3 and pressurisation has commenced. A seating cushion 7 fixed to closure element 6 has been unfolded together with closure element 6 out of opening 5 and has already almost assumed its taut form. A back part 8 connected to seating cushion 7 is on the point of unfolding out of opening 5. Opening 5 is provided in a backrest 4 in FIGS. 1a-c. It is also in accordance with the invention as shown in FIG. 2b to provide opening 5 in seating area 3 and to close the same with the closure element. In such a configuration, back part 8 is fixed to the closure element and, when the latter is opened, is also folded out.

Obviously, it is also possible to provide opening 5 at another suitable place in the car interior, for example in a side panel, a door, the vehicle floor or an armrest of a vehicle seat.

The pressurisation has already continued further in FIG. 1b. Back part 8 is about to become upright and to unfold completely.

FIG. 1c shows child seat 1 in its functional form. In the example shown, shell shapes have been selected for the seating cushion and the back part, said shells shapes also allowing a child to be supported at the sides, especially when travelling round bends. Less pronounced and flatter forms can of course also be produced and are included in the idea of the invention. FIGS. 2a-2b show cross-sections through a vehicle seat and child seat 1 relieved of pressure, folded together and stowed away. Closure element 6 is folded up and closes opening 5 in a flush manner. In order to prevent accidental opening, but also for aesthetic reasons, a VELCRO® or zip fastening can for example also be provided running around the closure element.

Pneumatic child seat 1 never has to be removed for reasons of use and space; if it is required, closure element 6 is opened and the child seat pressurised, if it is no longer required, the pressure is released from child seat 1 and it is stowed away without any effort back into opening 5 provided for the purpose. It should be noted here that child seat 1 in the stowed state is well protected by closure element 6 and no demands are made either on passenger space or space for luggage.

The system for pressurisation and pressure relief comprises at least a compressed gas store 11, a vacuum pump 12, a directional control valve 13 and a compressed gas line 14. Pressure-generating means are not shown, such as for example a compressor, which fills the compressed gas store when the engine is running. These elements 11, 12, 13, 14 are arranged merely diagrammatically in FIGS. 3a-3b. Depending on the vehicle, these elements 11, 12, 13, 14 can be accommodated in completely different places. Compressed gas store 11 and the vacuum pump can for example be integrated into opening 5 itself, but also in the engine compartment. Compressed gas line 14 connects child seat 1 and directional control valve 13. The same compressed gas line 14 can thus be used for the pressurisation and for pumping empty. The pressure management is carried out by a control console 15, which is housed at a suitable point in the vehicle, for example on the dashboard. In the simplest configuration, the control console comprises an individual on/off switch, whereby "on" for example stands for full and "off" for empty. In order to avoid excessive pressurisation, a pressure sensor 16 of control console 15 signals that the operating pressure has been reached, after which further pressurisation is stopped. More complicated control consoles with, for example, temperature-dependent and/or weight-dependent pressure management are also included in the inventive idea, as well as other configurations of the compressed gas system.

Back part 8 of the child seat can be equipped with a dp/dt valve. If a child is pressed into child seat 1 in a rear-end collision, the dp/dt valve opens when a preset pressure change per time unit is reached and removes the pressure in back part 8 within the shortest possible time. At least a part of the impact energy experienced by the child can thus be absorbed, and the acceleration forces acting on the child and thus the risk of injury can be reduced.

Cross-sections through a vehicle seat and side views of a pressurised child seat 1 are shown in FIGS. 3a-3b. In order that the child seat is correctly positioned and also remains so during the journey, it is—as already mentioned—connected at least to the inside of closure element 6. This connection can be detachable or permanent, for example by means of VEL-CRO® fastenings 18, press-studs 20 or by gluing. Closure element 6 is essentially produced from the upholstery and the cover of the vehicle seat, but can of course be reinforced on the side of child seat 1. In order to support back part 8 separately, it can be designed in such a way that, in the presence of pressurisation, it extends with a pocket 17 into opening 5 and wedges itself there.

Analogous forms of solution can of course also be found for other types of installation. A child seat 1 according to the invention, which unfolds from the vehicle floor or an armrest, can for example have a pocket 17 which wedges child seat 1 between two vehicle seats or a vehicle seat and a side panel of the vehicle.

If the connection between child seat 1 and closure element 6 is designed detachable, child seat 1 or only seating cushion 7 or only back part 8 can be replaced extremely easily. It is possible, therefore, for child seat 1 to grow, as it were, with a child. The width and height of back part 8 and the width and length of seating cushion 7 can thus be varied and adapted by replacing cushions 7, 8. It is also possible for only one of cushions 7, 8 to be used, for example to raise the seating position. In a variant of child seat 1, seating cushion 7 and back part 8 can be designed connected, i.e. as a single cushion, and in turn be connected detachably to closure element 6.

FIG. 4 shows diagrammatically the structure of a child seat 1 according to the invention. It essentially comprises seating cushion 7 and back part 8, which are each produced from an envelope 2 and ribs 9 welded or glued therein. Envelope 2 is gas-tight and can, for this purpose, be constituted for example by a PU film or a PU-coated, PU-laminated or PU-flocked textile material. The shape of ribs 9 determines the cross-section of seating cushion 7 or back part 8. If ribs 9 are disposed U-shaped, a shell shape emerges in the presence of pressurisation, if they are rectangular, board-like cushions 7, 8 emerge. Further shapes and embodiments of ribs 9 are also in accordance with invention. An overpressure of approx 100-200 hPa suffices for the formation. The fixing of cushions 7, 8 to one another can be produced for example with one or more VELCRO® fastenings 18 or press-studs 20. For the individual design, cushions 7, 8 can also be provided with a replaceable cover 19. Color matching to personal taste or to the interior of the vehicle can thus easily be achieved. Preferences for certain materials can also be taken into account.

In another design of child seat 1 according to the invention (not shown), envelope 2 and ribs 9 of cushions 7, 8 are also produced from textile materials. Gas-tight tubes are, however, then inserted into chambers between ribs 9 and envelope 2 and pressurised. The tubes can form one or more connected chambers or each form an individual gas-tight chamber. In such a configuration, a cover 19 can for example be dispensed with.

The detail in FIG. 5 shows, in an enlarged fashion, a part of back part 8 in the region of a shoulder of a sitting child. A recess 21 for a belt band of a three-point belt is made there at the side in back part 8. Between seating cushion 7 and back part 8 in the region of the hips, the two cushions 7, 8 can be fashioned in such a way that space remains on both sides for the part of the belt band running roughly horizontally. A standard three-point belt can thus be worn in the usual way. If a recess 21 is introduced on both sides in back part 8, four-point belts can also be worn. These are particularly suitable for small children.

The invention claimed is:

1. A child seat for vehicles, comprising:
   an inflatable seating cushion;
   an inflatable back part;
   the seating cushion and the back part being adapted to unfold automatically in the presence of pressurisation and being stowable in a vehicle interior in a space-saving manner in an essentially empty state;
   wherein the child seat can be stowed in an opening in the vehicle interior, wherein the opening is adapted to be arranged in a backrest of a vehicle seat; and
   wherein in a pressurised state of the child seat, a part of an envelope extends from the back part into the opening in the backrest of the vehicle seat and wedges the child seat in position.

2. The child seat for vehicles according to claim 1, wherein the opening can be closed with a closure element in a flush and form-fit manner.

3. The child seat for vehicles according to claim 1, wherein the child seat can be emptied with a vacuum pump.

4. The child seat for vehicles according to claim 2, wherein the closure element is adapted to protect the child seat in the stowed, empty state; and
   wherein the closure element is connected detachably or permanently to an underside of a seating area or a rear side of the back part of the child seat and when unfolded, positions the child seat in an opened state.

5. The child seat for vehicles according to claim 1, wherein a recess is present on at least one side in a shoulder region of the child seat for wearing a three-point belt or the recess is provided on both sides of the shoulder region for wearing a four-point belt.

6. The child seat for vehicles according to claim 1, wherein the seating cushion and the back part are each separate air cushions which can be detachably connected to one another, or that the seating cushion and the back part are formed from a single air cushion.

7. The child seat for vehicles according to claim 6, wherein the seating cushion and the back part are detachably connected with VELCRO® fastenings or press-studs.

8. The child seat for vehicles according to claim 1, wherein the child seat comprising the seating cushion and the back part is sized and shaped to accommodate a child's physical dimensions.

9. The child seat for vehicles according to claim 1 further comprising:
   means for pressurisation and emptying of the child seat, said means comprising:
   a pressure gas store;
   a vacuum pump; and
   a directional control valve which can be controlled with a pressure sensor and a control console with at least one switch.

10. The child seat for vehicles according to claim 1, wherein the envelope is gas-tight and has, in its interior, ribs which give the envelope an external shape in the pressurised state.

11. The child seat for vehicles according to claim 10, wherein the envelope is made from a PU film or a PU-coated, PU-laminated or PU-flocked textile material.

12. The child seat for vehicles according to claim 1, wherein a removable cover is fitted around the seating cushion and around the back part.

13. A child seat for vehicles, comprising:

an inflatable seating cushion;

an inflatable back part;

the seating cushion and the back part being adapted to unfold automatically in the presence of pressurisation and being stowable in a vehicle interior in a space-saving manner in an essentially empty state;

wherein the child seat can be stowed in an opening in the vehicle interior, wherein the opening is adapted to be arranged in a seating area of a vehicle seat; and wherein in a pressurised state of the child seat, a part of an envelope extends from the seat cushion and into the opening in the seating area of the vehicle seat and wedges the child seat in position.

* * * * *